United States Patent [19]

Hong

[11] Patent Number: 5,699,126
[45] Date of Patent: Dec. 16, 1997

[54] PICTURE DEFINITION APPARATUS FOR VIDEO DISPLAY EQUIPMENT

[75] Inventor: Sung-Hoon Hong, Seoul, Rep. of Korea

[73] Assignee: LG Electronics, Inc., Seoul, Rep. of Korea

[21] Appl. No.: 524,768

[22] Filed: Sep. 7, 1995

[30] Foreign Application Priority Data

Sep. 10, 1994 [KR] Rep. of Korea .................. 22844/1994

[51] Int. Cl.$^6$ ................................................ H04N 5/208
[52] U.S. Cl. ........................ 348/625; 348/627; 348/606
[58] Field of Search ........................ 348/625, 627, 348/628, 629, 630, 631, 706, 774, 775, 663, 664, 665, 666, 667, 606; 358/162; H04N 5/21, 5/20, 5/208, 5/213, 5/212

[56] References Cited

U.S. PATENT DOCUMENTS

| | | | |
|---|---|---|---|
| 4,853,783 | 8/1989 | Ozaki | 348/606 |
| 5,151,787 | 9/1992 | Park | 348/625 |
| 5,369,446 | 11/1994 | Parker et al. | 348/625 |
| 5,412,432 | 5/1995 | Hong | 348/625 |
| 5,491,520 | 2/1996 | Nozawa et al. | 348/625 |
| 5,546,135 | 8/1996 | Okamoto et al. | 348/674 |
| 5,557,339 | 9/1996 | Dadourian | 348/586 |
| 5,559,563 | 9/1996 | Takahashi et al. | 348/625 |

FOREIGN PATENT DOCUMENTS

| | | | |
|---|---|---|---|
| 4-369179 | 12/1992 | Japan | H04N 5/208 |
| 6-253179 | 9/1994 | Japan | H04N 5/208 |

*Primary Examiner*—Glenton B. Burgess
*Assistant Examiner*—Chris Grant

[57] ABSTRACT

A picture definition apparatus for video display equipment comprising a first filtering circuit for extracting a high-frequency component from an input video signal, an amplifier for amplifying an output signal from the first filtering circuit, a first delay circuit for delaying the input video signal to match it with an output signal from the amplifier, and an adder for adding an output signal from the first delay circuit to the output signal from the amplifier. The picture definition apparatus further comprises a second filtering circuit for extracting maximum and minimum values from an output signal from the first delay circuit, a second delay circuit for delaying an output signal from the adder to match it with the maximum and minimum values from the second filtering circuit, a first comparison circuit for comparing an output signal from the second delay circuit with the minimum value from the second filtering circuit, a second comparison circuit for comparing the output signal from the second delay circuit with the maximum value from the second filtering circuit, and an output selector for selectively outputting the output signal from the second delay circuit and the maximum and minimum values from the second filtering circuit in response to output signals from the first and second comparison circuits.

5 Claims, 8 Drawing Sheets

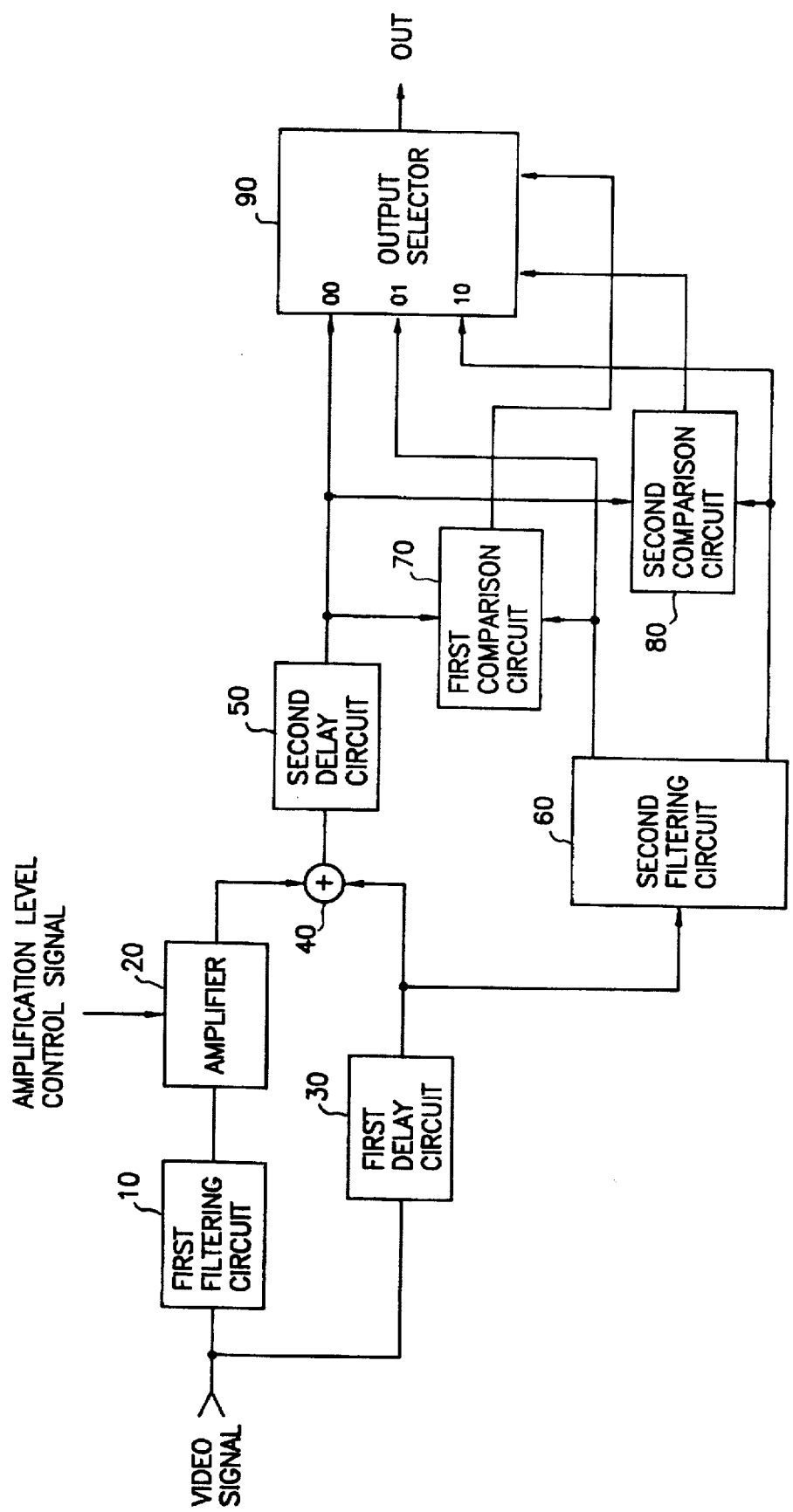

PICTURE DEFINITION APPARATUS FOR VIDEO DISPLAY EQUIPMENT

BACKGROUND OF THE INVENTION

1. Field of the Invention

The present invention relates in general to a picture definition apparatus for increasing a definition degree of pictures in video display equipment such as a television (TV), and more particularly to an improved picture definition apparatus for removing an overshoot, an undershoot and a spike noise appearing at a transition edge of a video signal to prevent a distortion of the video signal and color deformation, so as to increase the definition degree of pictures.

2. Description of the Prior Art

Generally, an enhancer has been proposed as a picture definition apparatus for improvement in a picture quality in video display equipment. The enhancer corrects a frequency characteristic of a luminance signal to make pictures hard or soft to enhance them. Such a conventional picture definition apparatus will hereinafter be described with reference to FIG. 1.

Referring to FIG. 1, there is shown a block diagram of a conventional picture definition apparatus for video display equipment. As shown in this drawing, the conventional picture definition apparatus comprises a filtering circuit 1 for high pass filtering or band pass filtering an input video signal to extract a high-frequency component therefrom, an amplifier 2 for amplifying an output signal from the filtering circuit 1 in response to an external amplification level control signal, a delay circuit 3 for delaying the input video signal to match it with an output signal from the amplifier 2, and an adder 4 for adding an output signal from the delay circuit 3 to the output signal from the amplifier 2.

The operation of the conventional picture definition apparatus for the video display equipment with the above-mentioned construction will hereinafter be described with reference to FIGS. 1 to 3C.

First, the input video signal as shown in FIG. 2A is high pass filtered or band pass filtered by the filtering circuit 1 so that the high-frequency component can be extracted therefrom. The amplifier 2 amplifies the output signal from the filtering circuit 1 in response to the external amplification level control signal and outputs the resultant signal as shown in FIG. 2B to one input terminal of the adder 4. In FIG. 2B, the reference numeral 5 designates a waveform of the output signal from the amplifier 2 when the amplification level is low and the reference numeral 6 designates a waveform of the output signal from the amplifier 2 when the amplification level is high. The input video signal as shown in FIG. 2A is also delayed by the delay circuit 3 and applied to the other input terminal of the adder 4.

The adder 4 adds the amplified high-frequency signal from the amplifier 2 to the delayed video signal from the delay circuit 3 and outputs the resultant signal with a transition edge enhanced as shown in FIG. 2C.

On the other hand, in the case where a spike noise as shown in FIG. 3A is contained in the input video signal, it is reformed as shown in FIG. 3B by the filtering circuit 1 and the amplifier 2 and applied to the one input terminal of the adder 4. The spike noise as shown in FIG. 3A is also delayed by the delay circuit 3 and applied to the other input terminal of the adder 4. The adder 4 adds the output signal from the amplifier 2 to the output signal from the delay circuit 3. As a result of the addition, the adder 4 outputs an increased spike noise as shown in FIG. 3C.

As mentioned above, the conventional picture definition apparatus increases the definition degree of pictures by enhancing the transition edge of the video signal as shown in FIG. 2C. However, in the conventional picture definition apparatus, an undershoot and an overshoot are generated at the start and end of the transition edge of the video signal, respectively. Further, in the case where the spike noise is contained in the video signal, it is outputted while being increased. In result, the undershoot, overshoot and spike noise cause a distortion of the video signal and color deformation, resulting in a reduction in the definition degree of pictures.

SUMMARY OF THE INVENTION

Therefore, the present invention has been made in view of the above problem, and it is an object of the present invention to provide a picture definition apparatus for video display equipment which is capable of limiting an overshoot, an undershoot and a spike noise appearing at a transition edge of a video signal within the range between maximum and minimum values from a filtering circuit and reducing a width of the transition edge, so as to obtain a definite picture with an increased bandwidth.

In accordance with the present invention, the above and other objects can be accomplished by a provision of a picture definition apparatus for video display equipment comprising first filtering means for band pass filtering an input video signal to extract a high-frequency component therefrom, amplification means for amplifying an output signal from the first filtering means in response to an external amplification level control signal, first delay means for delaying the input video signal to match it with an output signal from the amplification means, and addition means for adding an output signal from the first delay means to the output signal from the amplification means, wherein the improvement comprises second filtering means for extracting maximum and minimum values from an output signal from the first delay means; second delay means for delaying an output signal from the addition means to match it with the maximum and minimum values from the second filtering means; first comparison means for comparing an output signal from the second delay means with the minimum value from the second filtering means; second comparison means for comparing the output signal from the second delay means with the maximum value from the second filtering means; and output selection means for selectively outputting the output signal from the second delay means and the maximum and minimum values from the second filtering means in response to output signals from the first and second comparison means.

BRIEF DESCRIPTION OF THE DRAWINGS

The above and other objects, features and advantages of the present invention will be more clearly understood from the following detailed description taken in conjunction with the accompanying drawings, in which:

FIG. 4 is a block diagram of a picture definition apparatus for video display equipment in accordance with an embodiment of the present invention;

DETAILED DESCRIPTION OF THE PREFERRED EMBODIMENTS

Figure 1:
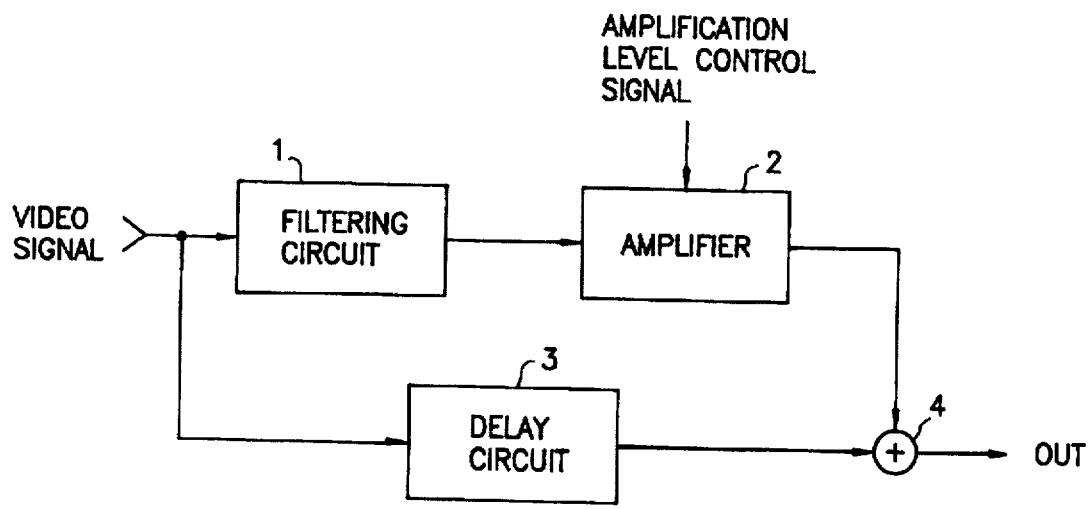
FIG. 1 is a block diagram of a conventional picture definition apparatus for video display equipment.
Figure 2A:
FIGS. 2A to 2C are waveform diagrams illustrating input and output of a video signal in FIG. 1.
Figure 2B:
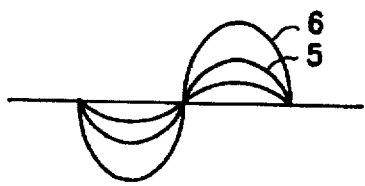
Figure 2C:
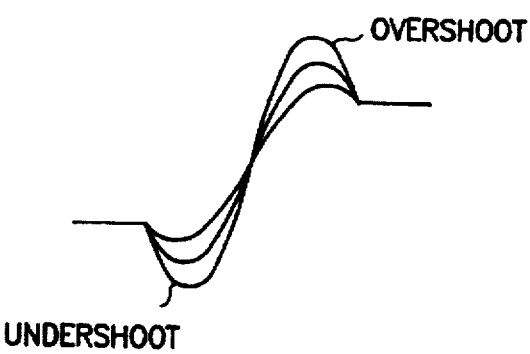
Figure 3A:
FIGS. 3A to 3C are waveform diagrams illustrating input and output of a spike noise in FIG. 1.
Figure 3B:
Figure 3C:
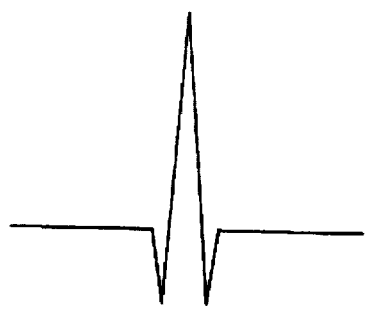

Referring to FIG. 4, there is shown a block diagram of a picture definition apparatus for video display equipment in accordance with an embodiment of the present invention. As shown in this drawing, the picture definition apparatus comprises a first filtering circuit 10 for band pass filtering an input video signal to extract a high-frequency component therefrom, an amplifier 20 for amplifying an output signal from the first filtering circuit 10 in response to an external amplification level control signal, a first delay circuit 30 for delaying the input video signal to match it with an output signal from the amplifier 20, and an adder 40 for adding an output signal from the first delay circuit 30 to the output signal from the amplifier 20.

The picture definition apparatus further comprises a second filtering circuit 60 for extracting maximum and minimum values from an output signal from the first delay circuit 30, a second delay circuit 50 for delaying an output signal from the adder 40 to match it with the maximum and minimum values from the second filtering circuit 60, a first comparison circuit 70 for comparing an output signal from the second delay circuit 50 with the minimum value from the second filtering circuit 60, a second comparison circuit 80 for comparing the output signal from the second delay circuit 50 with the maximum value from the second filtering circuit 60, and an output selector 90 for selectively outputting the output signal from the second delay circuit 50 and the maximum and minimum values from the second filtering circuit 60 in response to output signals from the first and second comparison circuits 70 and 80.

Figure 5:
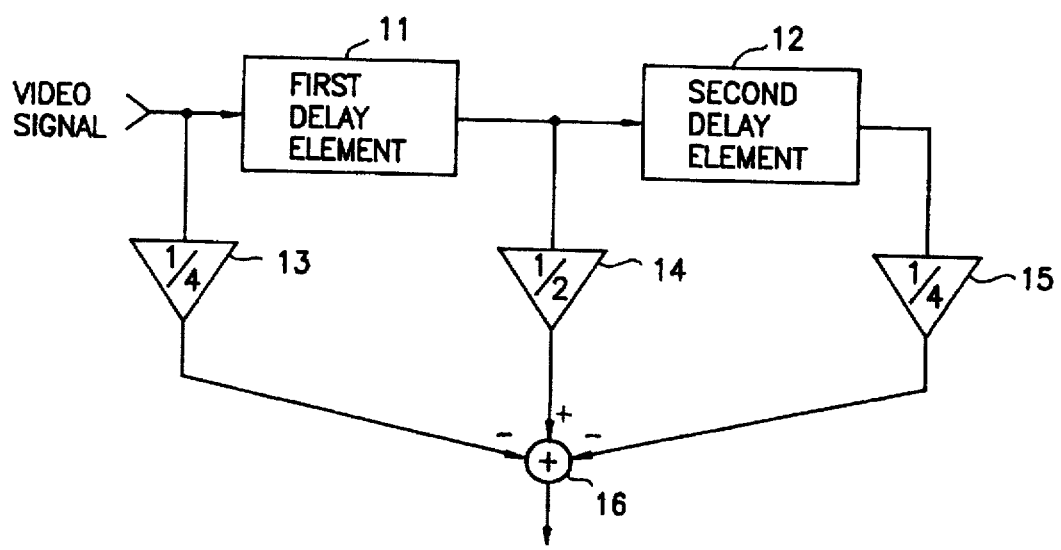
FIG. 5 is a detailed block diagram of a first filtering circuit in FIG. 4 in accordance with the embodiment of the present invention.

Referring to FIG. 5, there is shown a detailed block diagram of the first filtering circuit 10 in FIG. 4 in accordance with the embodiment of the present invention. As shown in this drawing, the first filtering circuit 10 includes first and second delay elements 11 and 12 connected in series to sequentially delay the input video signal, a first multiplier 13 for multiplying the input video signal by ¼, a second multiplier 14 for multiplying an output signal from the first delay element 11 by ½, a third multiplier 15 for multiplying an output signal from the second delay element 12 by ¼, and a subtracter 16 for subtracting output signals from the first and third multipliers 13 and 15 from an output signal from the second multiplier 14.

Figure 6:
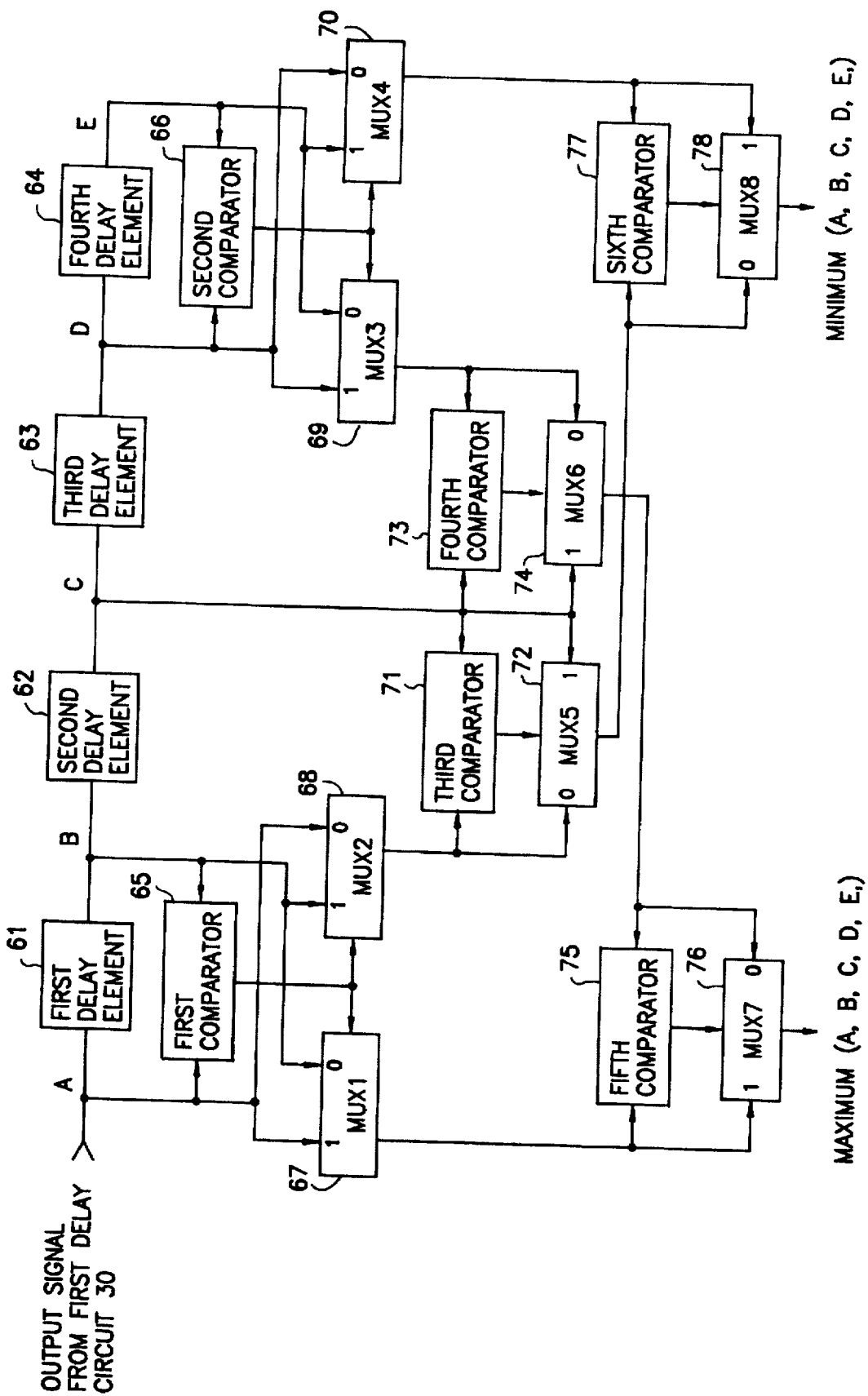
FIG. 6 is a detailed block diagram of a second filtering circuit in FIG. 4 in accordance with the embodiment of the present invention.

Referring to FIG. 6, there is shown a detailed block diagram of an embodiment of the second filtering circuit 60 in FIG. 4 in accordance with the embodiment of the present invention. As shown in this drawing, the second filtering circuit 60 includes first to fourth delay elements 61–64 connected in series to sequentially delay the output signal from the first delay circuit 30, a first comparator 65 for comparing the output signal from the first delay circuit 30 with an output signal from the first delay element 61, a second comparator 66 for comparing an output signal from the third delay element 63 with an output signal from the fourth delay element 64, a first multiplexer 67 for selecting a higher one of the output signal from the first delay circuit 30 and the output signal from the first delay element 61 in response to an output signal from the first comparator 65, a second multiplexer 68 for selecting a lower one of the output signal from the first delay circuit 30 and the output signal from the first delay element 61 in response to the output signal from the first comparator 65, a third multiplexer 69 for selecting a higher one of the output signal from the third delay element 63 and the output signal from the fourth delay element 64 in response to an output signal from the second comparator 66, and a fourth multiplexer 70 for selecting a lower one of the output signal from the third delay element 63 and the output signal from the fourth delay element 64 in response to the output signal from the second comparator 66.

The second filtering circuit 60 further includes a third comparator 71 for comparing an output signal from the second multiplexer 68 with an output signal from the second delay element 62, a fifth multiplexer 72 for selecting a lower one of the output signal from the second multiplexer 68 and the output signal from the second delay element 62 in response to an output signal from the third comparator 71, a fourth comparator 73 for comparing an output signal from the third multiplexer 69 with the output signal from the second delay element 62, and a sixth multiplexer 74 for selecting a higher one of the output signal from the third multiplexer 69 and the output signal from the second delay element 62 in response to an output signal from the fourth comparator 73.

The second filtering circuit 60 further includes a fifth comparator 75 for comparing an output signal from the first multiplexer 67 with an output signal from the sixth multiplexer 74, a seventh multiplexer 76 for selecting a higher one of the output signal from the first multiplexer 67 and the output signal from the sixth multiplexer 74 in response to an output signal from the fifth comparator 75 and outputting the selected signal as the maximum value to the second comparison circuit 80 and the output selector 90, a sixth comparator 77 for comparing an output signal from the fourth multiplexer 70 with an output signal from the fifth multiplexer 72, and an eighth multiplexer 78 for selecting a lower one of the output signal from the fourth multiplexer 70 and the output signal from the fifth multiplexer 72 in response to an output signal from the sixth comparator 77 and outputting the selected signal as the minimum value to the first comparison circuit 70 and the output selector 90.

The operation of the picture definition apparatus for the video display equipment with the above-mentioned construction in accordance with the embodiment of the present invention will hereinafter be described in detail with reference to FIGS. 4 to 6.

First, the first delay circuit 30 delays the input video signal to match it with the output signal from the amplifier 20. The first delay circuit 30 then applies the delayed video signal to one input terminal of the adder 40.

The input video signal is also fed to the first filtering circuit 10. In the first filtering circuit 10, as shown in FIG.

5, the input video signal is sequentially delayed by the first and second delay elements 11 and 12. The first multiplier 13 multiplies the input video signal by ¼ and outputs the resultant signal to the subtracter 16. The second multiplier 14 multiplies the output signal from the first delay element 11 by ½ and outputs the resultant signal to the subtracter 16. The third multiplier 15 multiplies the output signal from the second delay element 12 by ¼ and outputs the resultant signal to the subtracter 16. The subtracter 16 subtracts the output signals from the first and third multipliers 13 and 15 from the output signal from the second multiplier 14. As a result of the subtraction, the subtracter 16 produces a ½ sampling frequency component. Here, the subtracter 16 has a frequency response characteristic as follows:

$$|H(\omega)|=½ (1-\cos \omega)$$

The filtered high-frequency signal from the first filtering circuit 10 is amplified by the amplifier 20 in response to the external amplification level control signal and applied to the other input terminal of the adder 40.

The adder 40 adds the amplified high-frequency signal from the amplifier 20 to the delayed video signal from the first delay circuit 30 and outputs the resultant signal to the second delay circuit 50. The second delay circuit 50 delays the output signal from the adder 40 and applies the delayed signal to a first input terminal of the output selector 90, one input terminal of the first comparison circuit 70 and one input terminal of the second comparison circuit 80. The second filtering circuit 60 extracts the maximum and minimum values from the delayed video signal from the first delay circuit 30.

In the second filtering circuit 60, as shown in FIG. 6, the delayed video signal from the first delay circuit 30 is sequentially delayed by the first to fourth delay elements 61–64. Here, A, B, C, D and E designate the output signal from the first delay circuit 30 and the output signals from the first to fourth delay elements 61–64, respectively. The first comparator 65 compares the output signal A from the first delay circuit 30 with the output signal B from the first delay element 61 and outputs the resultant signal to the first and second multiplexers 67 and 68. The first multiplexer 67 selects the higher one of the output signal A from the first delay circuit 30 and the output signal B from the first delay element 61 in response to the output signal from the first comparator 65. The first multiplexer 67 then outputs the selected signal A or B to the fifth comparator 75 and the seventh multiplexer 76. The second multiplexer 68 selects the lower one of the output signal A from the first delay circuit 30 and the output signal B from the first delay element 61 in response to the output signal from the first comparator 65. The second multiplexer 68 then outputs the selected signal A or B to the third comparator 71 and the fifth multiplexer 72.

The second comparator 66 compares the output signal D from the third delay element 63 with the output signal E from the fourth delay element 64 and outputs the resultant signal to the third and fourth multiplexers 69 and 70. The third multiplexer 69 selects the higher one of the output signal D from the third delay element 63 and the output signal E from the fourth delay element 64 in response to the output signal from the second comparator 66. The third multiplexer 69 then outputs the selected signal D or E to the fourth comparator 73 and the sixth multiplexer 74. The fourth multiplexer 70 selects the lower one of the output signal D from the third delay element 63 and the output signal E from the fourth delay element 64 in response to the output signal from the second comparator 66. The fourth multiplexer 70 then outputs the selected signal D or E to the sixth comparator 77 and the eighth multiplexer 78.

The third comparator 71 compares the output signal A or B from the second multiplexer 68 with the output signal C from the second delay element 62 and outputs the resultant signal to the fifth multiplexer 72. The fourth comparator 73 compares the output signal D or E from the third multiplexer 69 with the output signal C from the second delay element 62 and outputs the resultant signal to the sixth multiplexer 74. The fifth multiplexer 72 selects the lower one of the output signal A or B from the second multiplexer 68 and the output signal C from the second delay element 62 in response to the output signal from the third comparator 71. The fifth multiplexer 72 then outputs the selected signal A, B or C to the sixth comparator 77 and the eighth multiplexer 78. The sixth multiplexer 74 selects the higher one of the output signal D or E from the third multiplexer 69 and the output signal C from the second delay element 62 in response to the output signal from the fourth comparator 73. The sixth multiplexer 74 then outputs the selected signal C, D or E to the fifth comparator 75 and the seventh multiplexer 76.

The fifth comparator 75 compares the output signal A or B from the first multiplexer 67 with the output signal C, D or E from the sixth multiplexer 74 and outputs the resultant signal to the seventh multiplexer 76. The seventh multiplexer 76 selects the higher one of the output signal A or B from the first multiplexer 67 and the output signal C, D or E from the sixth multiplexer 74 in response to the output signal from the fifth comparator 75. The seventh multiplexer 76 then outputs the selected signal A, B, C, D or E as the maximum value to the other input terminal of the second comparison circuit 80. In result, the seventh multiplexer 76 selects the maximum one of the five signals A, B, C, D and E.

The sixth comparator 77 compares the output signal D or E from the fourth multiplexer 70 with the output signal A, B or C from the fifth multiplexer 72 and outputs the resultant signal to the eighth multiplexer 78. The eighth multiplexer 78 selects the lower one of the output signal D or E from the fourth multiplexer 70 and the output signal A, B or C from the fifth multiplexer 72 in response to the output signal from the sixth comparator 77. The eighth multiplexer 78 then outputs the selected signal A, B, C, D or E as the minimum value to the other input terminal of the first comparison circuit 70. In result, the eighth multiplexer 78 selects the minimum one of the five signals A, B, C, D and E.

Also, the minimum and maximum values from the eighth and seventh multiplexers 78 and 76 are supplied to second and third input terminals of the output selector 90, respectively.

Then, the first comparison circuit 70 compares the output signal from the second delay circuit 50 with the minimum value from the second filtering circuit 60. If the output signal from the second delay circuit 50 is lower in level than the minimum value from the second filtering circuit 60, the first comparison circuit 70 outputs a high level signal to the output selector 90. The second comparison circuit 80 compares the output signal from the second delay circuit 50 with the maximum value from the second filtering circuit 60. If the output signal from the second delay circuit 50 is higher in level than the maximum value from the second filtering circuit 60, the second comparison circuit 80 outputs a high level signal to the output selector 90.

If the output signals from the first and second comparison circuits 70 and 80 are both low in level, the output selector 90 selects the output signal from the second delay circuit 50. In the case where the output signal from the first comparison circuit 70 is low in level and the output signal from the second comparison circuit 80 is high in level, the output selector 90 selects the maximum value from the second filtering circuit 60. When the output signal from the first comparison circuit 70 is high in level and the output signal from the second comparison circuit 80 is low in level, the output selector 90 selects the minimum value from the second filtering circuit 60.

The above-mentioned operation of the picture definition apparatus for the video display equipment in accordance with the embodiment of the present invention will hereinafter be described in more detail with reference to FIGS. 7A to 8D.

Figure 7A:
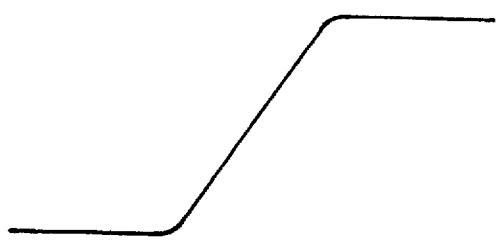
FIGS. 7A to 7D are waveform diagrams illustrating input and output of a video signal in FIG. 4 in accordance with the embodiment of the present invention.
Figure 7B:
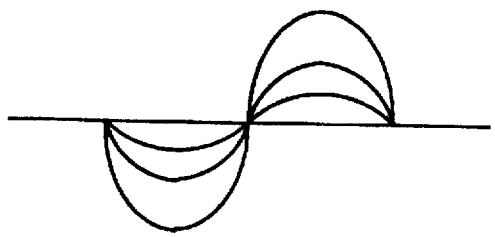

First, the input video signal as shown in FIG. 7A is band pass filtered by the first filtering circuit 20 and amplified by the amplifier 20 in response to the external amplification level control signal. As a result, the amplifier 20 supplies its output signal as shown in FIG. 7B to the one input terminal of the adder 40. The input video signal as shown in FIG. 7A is also delayed by the first delay circuit 30 and applied to the other input terminal of the adder 4.

Figure 7C:
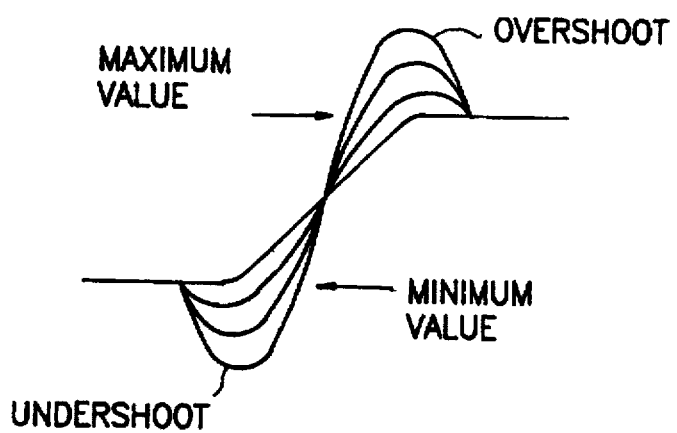

The adder 40 adds the amplified high-frequency signal from the amplifier 20 to the delayed video signal from the first delay circuit 30 and outputs the resultant signal in which an undershoot and an overshoot appear at the start and end of a transition edge, respectively, as shown in FIG. 7C. The output signal from the adder 40 is delayed by the second delay circuit 50 and applied to the first input terminal of the output selector 90, the one input terminal of the first comparison circuit 70 and the one input terminal of the second comparison circuit 80.

The delayed video signal from the first delay circuit 30 is also applied to the second filtering circuit 60 which extracts the maximum and minimum values therefrom. Then, the second filtering circuit 60 outputs the extracted minimum value to the other input terminal of the first comparison circuit 70 and the second input terminal of the output selector 90. The second filtering circuit 60 also outputs the extracted maximum value to the other input terminal of the second comparison circuit 80 and the third input terminal of the output selector 90.

Figure 7D:
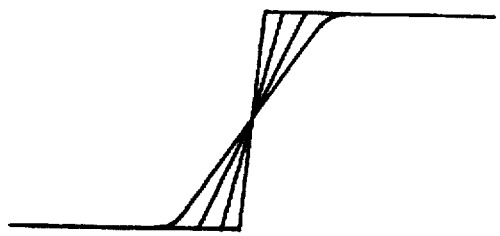

If the output signals from the first and second comparison circuits 70 and 80 are both low in level, namely, the level of the output signal from the second delay circuit 50 is present between the maximum and minimum values from the second filtering circuit 60, the output selector 90 selects the output signal from the second delay circuit 50. In the case where the output signal from the first comparison circuit 70 is low in level and the output signal from the second comparison circuit 80 is high in level, namely, the overshoot of the output signal from the second delay circuit 50 is higher than the maximum value from the second filtering circuit 60, the output selector 90 selects the maximum value from the second filtering circuit 60 to limit the overshoot of the output signal from the second delay circuit 50 thereto. When the output signal from the first comparison circuit 70 is high in level and the output signal from the second comparison circuit 80 is low in level, namely, the undershoot of the output signal from the second delay circuit 50 is lower than the minimum value from the second filtering circuit 60, the output selector 90 selects the minimum value from the second filtering circuit 60 to limit the undershoot of the output signal from the second delay circuit 50 thereto. As a result, the output selector 90 produces its output signal in which the undershoot and overshoot are removed as shown in FIG. 7D. On the other hand, if the amplifier 20 is increased in amplification level, the transition edge is reduced in width and increased in slope, thereby increasing a bandwidth of picture.

Figure 8A:
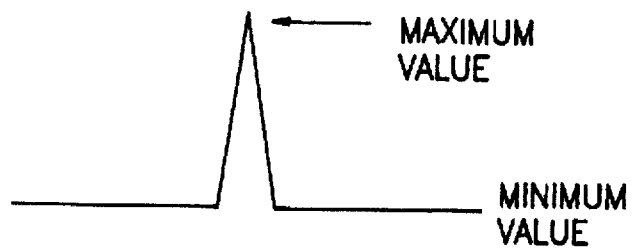
FIGS. 8A to 8D are waveform diagrams illustrating input and output of a spike noise in FIG. 4 in accordance with the embodiment of the present invention.
Figure 8B:
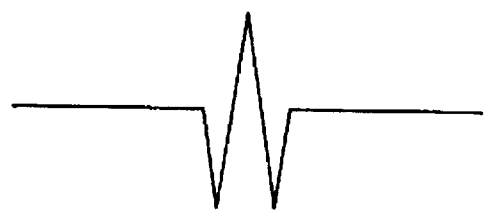
Figure 8C:
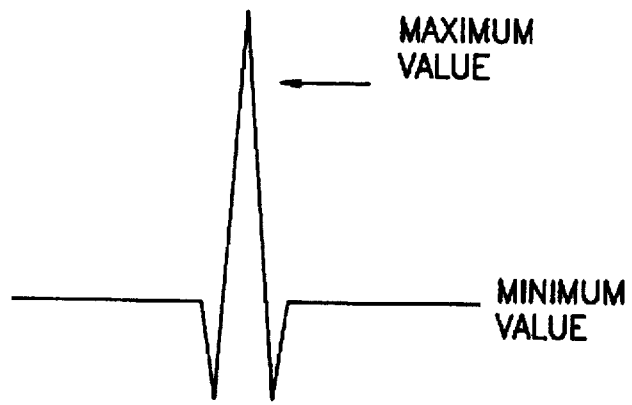

On the other hand, in the case where a spike noise as shown in FIG. 8A is contained in the video signal, it is reformed as shown in FIG. 8B by the first filtering circuit 10 and the amplifier 20 and applied to the one input terminal of the adder 40. The spike noise as shown in FIG. 8A is also delayed by the first delay circuit 30 and applied to the other input terminal of the adder 40. The adder 40 adds the output signal from the amplifier 20 to the output signal from the first delay circuit 30. As a result of the addition, the adder 40 outputs an increased spike noise as shown in FIG. 8C.

Figure 8D:

Then, the spike noise from the adder 40 are delayed by the second delay circuit 50 and compared by the first and second comparison circuits 70 and 80 with the minimum and maximum values from the second filtering circuit 60, respectively. If the spike noise from the adder 40 is beyond the minimum and maximum values from the second filtering circuit 60, it is limited to those values. As a result, a spike noise from the output selector 90 as shown in FIG. 8D is the same as that shown in FIG. 8A, with no increase.

Figure 9:
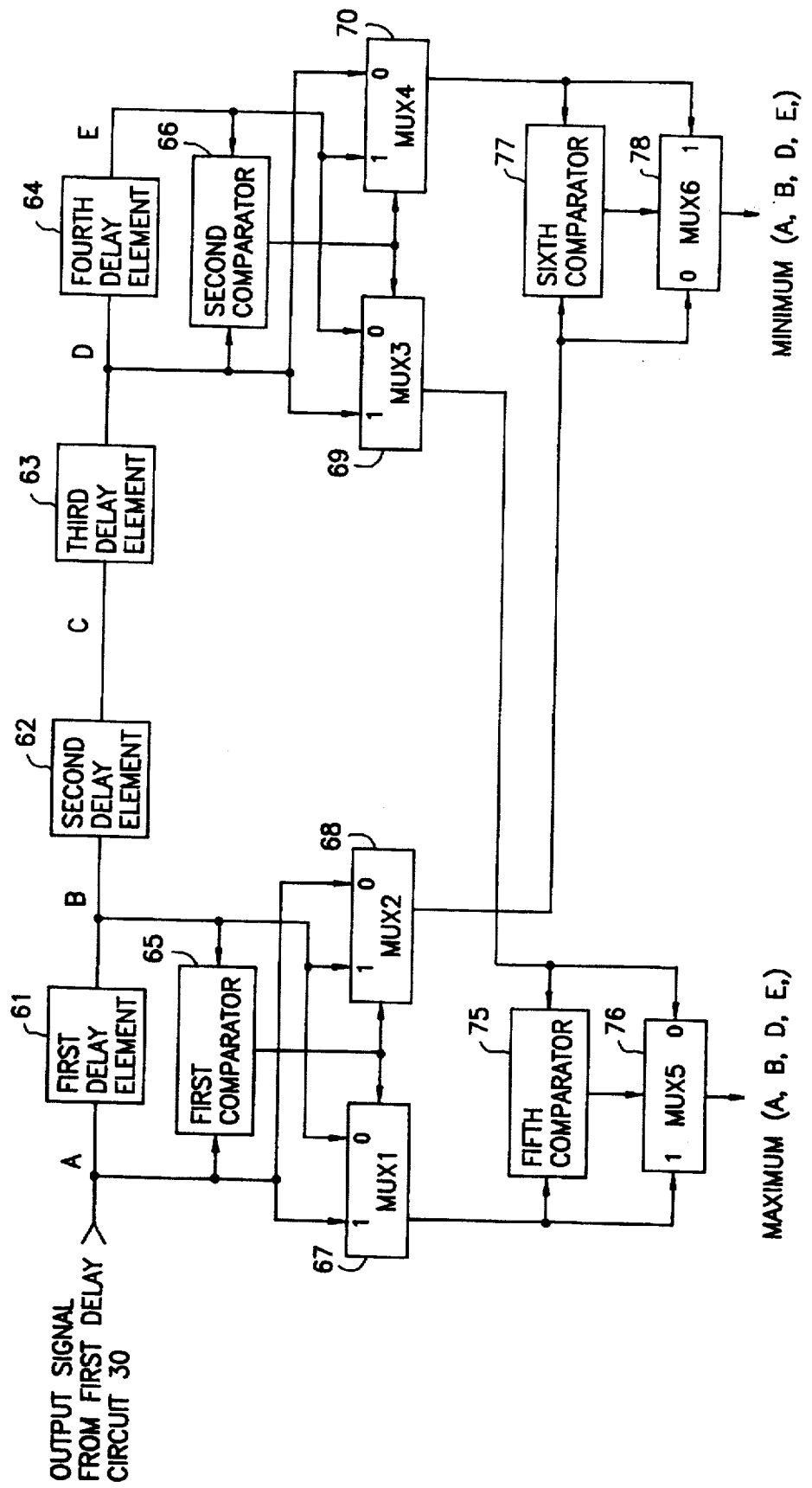
FIG. 9 is a detailed block diagram of the second filtering circuit in FIG. 4 in accordance with an alternative embodiment of the present invention.

Referring to FIG. 9, there is shown a detailed block diagram of the second filtering circuit 60 in FIG. 4 in accordance with an alternative embodiment of the present invention. The construction of the second embodiment is substantially the same as that of the first embodiment in FIG. 6, with the exception that the third and fourth comparators 71 and 73 and the fifth and sixth multiplexers 72 and 74 are removed, the output signal from the second multiplexer 68 is directly applied to the sixth comparator 77 and the output signal from the third multiplexer 69 is directly applied to the fifth comparator 75. In accordance with the second embodiment of the present invention, the spike noise is removed.

The operation of removing the spike noise in accordance with the second embodiment of the present invention will hereinafter be described in detail with reference to FIGS. 9 to 10F.

Figure 10A:
FIGS. 10A to 10F are waveform diagrams illustrating input and output of the spike noise in FIG. 4 in accordance with the alternative embodiment of the present invention.
Figure 10B:
Figure 10C:
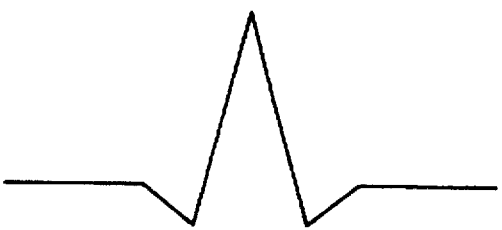

In the case where the spike noise as shown in FIG. 10A is contained in the video signal, it is reformed as shown in FIG. 10B by the first filtering circuit 10 and the amplifier 20 and applied to the one input terminal of the adder 40. The spike noise as shown in FIG. 10A is also delayed by the first delay circuit 30 and applied to the other input terminal of the adder 40. The adder 40 adds the output signal from the amplifier 20 to the output signal from the first delay circuit 30. As a result of the addition, the adder 40 outputs an increased spike noise as shown in FIG. 10C.

Figure 10D:
Figure 10E:
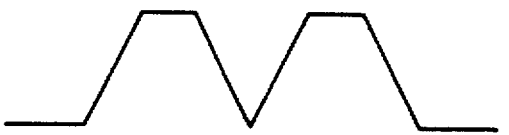
Figure 10F:

Then, the spike noise from the adder 40 are delayed by the second delay circuit 50 and compared by the first and second comparison circuits 70 and 80 with the minimum and maximum values from the second filtering circuit 60 as shown in FIGS. 10E and 10D, respectively. If the spike noise from the adder 40 is beyond the minimum and maximum values from the second filtering circuit 60, it is limited to those values. As a result, the output selector 90 produces its output signal in which the spike noise is removed as shown in FIG. 10F.

As apparent from the above description, according to the present invention, the overshoot and undershoot appearing at the transition edge of the video signal and the spike noise contained therein are compared with the maximum and minimum values from the filtering circuit. If the overshoot, undershoot and spike noise are beyond the maximum and minimum values from the filtering circuit as a result of the comparison, they are limited to those values. Therefore, the picture definition apparatus of the present invention has the effect of preventing a distortion of the video signal and color deformation to increase a definition degree of pictures.

Although the preferred embodiments of the present invention have been disclosed for illustrative purposes, those skilled in the an will appreciate that various modifications, additions and substitutions are possible, without departing from the scope and spirit of the invention as disclosed in the accompanying claims.

What is claimed is:

1. A picture definition apparatus for video display equipment comprising first filtering means for band pass filtering an input video signal to extract a high-frequency component therefrom, amplification means for amplifying an output signal from said first filtering means in response to an external amplification level control signal, first delay means for delaying the input video signal to match it with an output signal from said amplification means, and addition means for adding an output signal from said first delay means to the output signal from said amplification means, wherein the improvement comprises:

second filtering means for extracting maximum and minimum values from an output signal from said first delay means;

second delay means for delaying an output signal from said addition means to match it with the maximum and minimum values from said second filtering means;

first comparison means for comparing an output signal from said second delay means with the minimum value from said second filtering means;

second comparison means for comparing the output signal from said second delay means with the maximum value from said second filtering means; and output selection means for selectively outputting the output signal from said second delay means and the maximum and minimum values from said second filtering means in response to output signals from said first and second comparison means.

2. A picture definition apparatus for video display equipment as set forth in claim 1, wherein said first comparison means outputs a high level signal to said output selection means if the output signal from said second delay means is lower in level than the minimum value from said second filtering means and said second comparison means outputs a high level signal to said output selection means if the output signal from said second delay means is higher in level than the maximum value from said second filtering means.

3. A picture definition apparatus for video display equipment as set forth in claim 1, wherein said output selection means selects the output signal from said second delay means if the output signals from said first and second comparison means are both low in level, the maximum value from said second filtering means if the output signal from said first comparison means is low in level and the output signal from said second comparison means is high in level, and the minimum value from said second filtering means if the output signal from said first comparison means is high in level and the output signal from said second comparison means is low in level, whereby an overshoot and an undershoot of a transition edge of the input video signal are limited within the range between the maximum and minimum values from said second filtering means.

4. A picture definition apparatus for video display equipment as set forth in claim 1, wherein said second filtering means includes:

first to fourth delay elements connected in series to sequentially delay the output signal from said first delay means;

a first comparator for comparing the output signal from said first delay means with an output signal from said first delay element;

a second comparator for comparing an output signal from said third delay element with an output signal from said fourth delay element;

a first multiplexer for selecting a higher one of the output signal from said first delay means and the output signal from said first delay element in response to an output signal from said first comparator;

a second multiplexer for selecting a lower one of the output signal from said first delay means and the output signal from said first delay element in response to the output signal from said first comparator;

a third multiplexer for selecting a higher one of the output signal from said third delay element and the output signal from said fourth delay element in response to an output signal from said second comparator;

a fourth multiplexer for selecting a lower one of the output signal from said third delay element and the output signal from said fourth delay element in response to the output signal from said second comparator;

a third comparator for comparing an output signal from said second multiplexer with an output signal from said second delay element;

a fifth multiplexer for selecting a lower one of the output signal from said second multiplexer and the output signal from said second delay element in response to an output signal from said third comparator;

a fourth comparator for comparing an output signal from said third multiplexer with the output signal from said second delay element;

a sixth multiplexer for selecting a higher one of the output signal from said third multiplexer and the output signal from said second delay element in response to an output signal from said fourth comparator;

a fifth comparator for comparing an output signal from said first multiplexer with an output signal from said sixth multiplexer;

a seventh multiplexer for, selecting a higher one of the output signal from said first multiplexer and the output signal from said sixth multiplexer in response to an output signal from said fifth comparator and outputting the selected signal as the maximum value to said second comparison means and said output selection means;

a sixth comparator for comparing an output signal from said fourth multiplexer with an output signal from said fifth multiplexer; and an eighth multiplexer for selecting a lower one of the output signal from said fourth multiplexer and the output signal from said fifth multiplexer in response to an output signal from said sixth comparator and outputting the selected signal as the minimum value to said first comparison means and said output selection means.

5. A picture definition apparatus for video display equipment as set forth in claim 1, wherein said second filtering means includes:

first to fourth delay elements connected in series to sequentially delay the output signal from said first delay means;

a first comparator for comparing the output signal from said first delay means with an output signal from said first delay element;

a second comparator for comparing an output signal from said third delay element with an output signal from said fourth delay element;

a first multiplexer for selecting a higher one of the output signal from said first delay means and the output signal from said first delay element in response to an output signal from said first comparator;

a second multiplexer for selecting a lower one of the output signal from said first delay means and the output signal from said first delay element in response to the output signal from said first comparator;

a third multiplexer for selecting a higher one of the output signal from said third delay element and the output signal from said fourth delay element in response to an output signal from said second comparator;

a fourth multiplexer for selecting a lower one of the output signal from said third delay element and the output signal from said fourth delay element in response to the output signal from said second comparator;

a third comparator for comparing an output signal from said first multiplexer with an output signal from said third multiplexer;

a fourth comparator for comparing an output signal from said second multiplexer with an output signal from said fourth multiplexer;

a fifth multiplexer for selecting a higher one of the output signal from said first multiplexer and the output signal from said third multiplexer in response to an output signal from said third comparator and outputting the selected signal as the maximum value to said second comparison means and said output selection means; and a sixth multiplexer for selecting a lower one of the output signal from said second multiplexer and the output signal from said fourth multiplexer in response to an output signal from said fourth comparator and outputting the selected signal as the minimum value to said first comparison means and said output selection means.

* * * * *